United States Patent
Hasegawa et al.

(10) Patent No.: US 6,828,707 B2
(45) Date of Patent: Dec. 7, 2004

(54) STARTER HAVING A SEAL MEMBER NEAR BEARING FOR HOLDING OUTPUT SHAFT

(75) Inventors: Youichi Hasegawa, Kasugai (JP); Sadayoshi Kajino, Nagoya (JP); Yasuo Osawa, Nitta-gun (JP)

(73) Assignees: Denso Corporation, Kariya (JP); Sawafuji Electric Co., Ltd., Tokyo (JP)

( * ) Notice: Subject to any disclaimer, the term of this patent is extended or adjusted under 35 U.S.C. 154(b) by 266 days.

(21) Appl. No.: 10/165,965

(22) Filed: Jun. 11, 2002

(65) Prior Publication Data

US 2003/0107280 A1 Jun. 12, 2003

(30) Foreign Application Priority Data

Oct. 31, 2001 (JP) ........................................ 2001-334958

(51) Int. Cl.[7] .................................................. H02K 7/08
(52) U.S. Cl. .......................................... 310/90; 310/89
(58) Field of Search ........................ 310/89–90, 98–99; 74/6, 7 A

(56) References Cited

U.S. PATENT DOCUMENTS

| | | | | |
|---|---|---|---|---|
| 4,938,084 A | * | 7/1990 | Morishita et al. | ................ 74/6 |
| 5,012,686 A | * | 5/1991 | Morishita et al. | ............. 74/7 A |
| 5,038,626 A | * | 8/1991 | Morishita et al. | ................ 74/6 |
| 6,097,119 A | | 8/2000 | Kuragaki et al. | |
| 2002/0157489 A1 | * | 10/2002 | Murata et al. | ................... 74/6 |

* cited by examiner

*Primary Examiner*—Thanh Lam
(74) *Attorney, Agent, or Firm*—Oliff & Berridge, PLC

(57) ABSTRACT

In a starter, a motor rotation shaft and an output shaft are connected through a reduction device. The output shaft is held rotatably by a rear bearing. The bearing has a plurality of through holes between the inner surface and the outer surface. A housing of the starter has a holding part for holding the bearing. A groove is formed annularly in the inner peripheral surface of the holding part. The groove is communicated with the through holes of the bearing. A seal member is press-fit in the holding part in proximity to a pinion gear side of the bearing. The seal member prevents foreign substances from entering the bearing surface of the bearing and inhibits the flowing out of lubricant from the bearing.

8 Claims, 3 Drawing Sheets

US 6,828,707 B2

STARTER HAVING A SEAL MEMBER NEAR BEARING FOR HOLDING OUTPUT SHAFT

CROSS REFERENCE TO RELATED APPLICATION

This application is based on and incorporates herein by reference Japanese Patent Application No. 2001-334958 filed Oct. 31, 2001.

FIELD OF THE INVENTION

The present invention relates to a reduction type starter having a reduction device, which transmits rotation of a motor to an output shaft in a reduced rotation speeds.

BACKGROUND OF THE INVENTION

A reduction-type starter is disclosed in U.S. Pat. No. 6,097,119 (JP-A-2000-297729). This starter has a planetary gear reduction device, through which a motor rotation shaft and an output shaft are arranged coaxially to each other. A one-way clutch is helical-spline fit on the outer periphery of the output shaft. The one-way clutch is movable in the axial direction. When an engine is started, the one-way clutch is pushed forward axially together with a pinion gear by using attraction of a magnetic switch until the pinion gear comes to mesh with a ring gear of an internal combustion engine and transmit the rotational force to the ring gear.

However, the starter has an opening at the nose of a housing covering the outer periphery of the pinion gear from which the pinion gear is exposed to engage with the ring gear. As a result, foreign substances (such as water, dust and the like) enter the housing from the opening and adhere onto the bearing surface of a bearing for holding the output shaft arranged in proximity to the reduction device. Thus, it causes loss in rotation and lowering of starter performance.

In addition, shortage of lubricant in the bearing causes lowering of starter performance. When the output shaft rotates, lubricant is discharged from the inside of the bearing onto the bearing surface so as to maintain smooth rotation of the output shaft. But if the starter is operated very frequently, the bearing is likely to run short of lubricant rapidly because the bearing cannot hold much lubricant. As a result, it causes lowering of starter performance.

SUMMARY OF THE INVENTION

It is therefore an object of the present invention to provide a starter, which prevents foreign substances from entering into the bearing surface of a bearing and maintains bearing performance for a long time.

According to the present invention, a starter has a bearing for holding an output shaft in proximity to a reduction device and a seal member in sliding contact with the outer periphery of the output shaft in proximity to the front side of the bearing, that is, to the side opposite the motor. The seal member prevents the entering of foreign substances into the bearing surface of the bearing and also limits the flowing out of lubricant held in the bearing. As a result, the bearing maintains high performance for a long time and lowering of starter performance is minimized.

A housing of the starter has a holding part for holding the bearing. A groove is formed annularly or in the ring-shape in the inner peripheral surface of the holding part. The bearing has a plurality of through holes, which pass in the radial direction between the inner surface and the outer surface. The through holes are communicated with the groove. The groove is filled with lubricant in advance. As the lubricant is provided from the groove to the bearing surface of the bearing by the through holes, shortage of lubricant in the bearing is prevented. As a result, even if the quantity of lubricant held at the bearing is small, the bearing maintains high performance for a long time and lowering of starter performance is minimized.

The bearing also has a plurality of recesses on the inner surface thereof. As the lubricant is held in the recesses of the bearing in advance, shortage of lubricant in the bearing is inhibited. Moreover, the housing of the starter has channels to lead the lubricant which flows out of the reduction device to the bearing. When the bearing runs short of lubricant, the recesses of the bearing are refilled with the lubricant which is led to the bearing by the channels. Thus, lubricant is used efficiently.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE REFERRED EMBODIMENT

Figure 1:
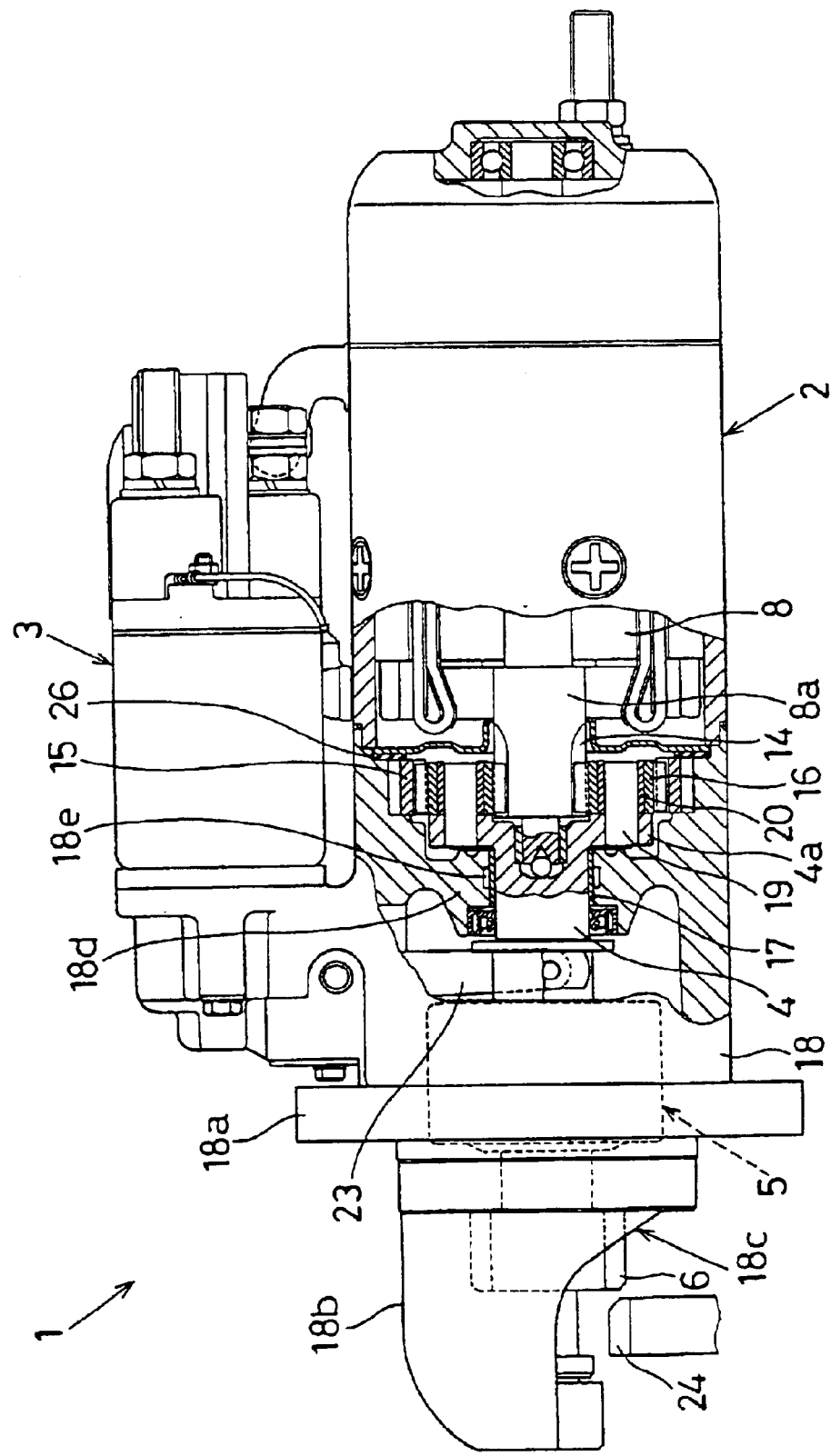
FIG. 1 is a side view showing, partly in section, a starter according to one embodiment of the present invention.

Referring first to FIG. 1, a starter 1 is constructed with an electric motor 2, an electromagnetic switch device 3, a reduction device, an output shaft 4, a one-way clutch 5, a pinion gear 6 and the like. The motor 2 generates rotating force. The electromagnetic switch device 3 controls turning-on/off of a motor current supplied to the motor 2. The reduction device transmits rotation of the motor 2 to the output shaft 4 in reduced speeds. The one-way clutch 5 is mounted on the output shaft 4, and transmits the rotation to the pinion gear 6 therethrough. The reduction device, output shaft 4, one-way clutch 5 and pinion gear 6 are housed in a generally cylindrical housing 18, which are fixedly coupled with a cylindrical yoke of the motor 2.

Figure 4:
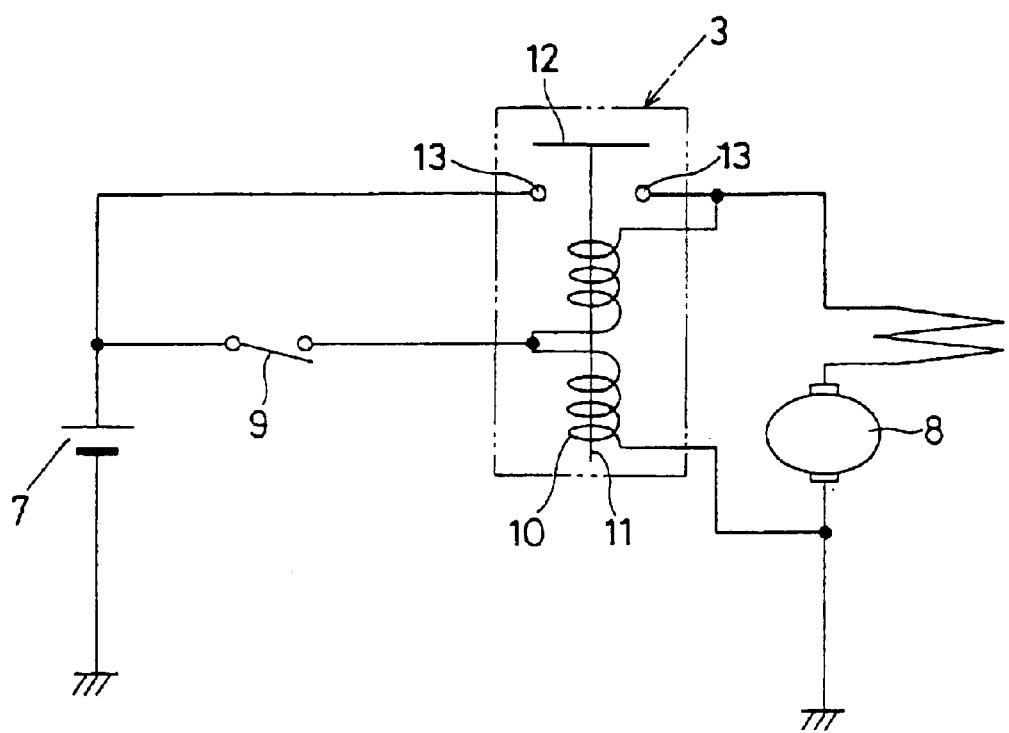
FIG. 4 is an electric wiring diagram showing electrical circuit of the starter shown in FIG. 1.

The motor 2 is a direct current type and constructed electrically as shown in FIG. 4. When the electromagnetic switch device 3 turns on a power supply circuit to the motor 2, the electric power is supplied from a battery 7 to an armature 8 to generate rotating force. The switch device 3 has an exciting coil 10 and a plunger 11 slidably fit in the exciting coil 10. When the exciting coil 10 is energized by the battery 7 by turning on a key switch 9, the exciting coil 10 attracts the plunger 11. A movable contact 12 provided on the plunger 11 comes into contact with a pair of fixed contacts 13 thereby to turn on the motor circuit.

The reduction device is a planetary gear type, and has a sun gear 14, an internal gear 15 and a plurality of (four) planetary gears 16. The sun gear 14 is formed on a motor rotation shaft (armature rotation shaft) 8a of the motor 2. The internal gear 15 is ring-shaped and disposed radially outside the sun gear 14. The planetary gears 16 are in meshing engagement with the sun gear 14 and the internal gear 15. When the armature 8 rotates, the sun gear 14 drives the planetary gears 16 to rotate about respective rotation axis which revolve around the sun gear 14. This revolving movement of the planetary gears 16 is transmitted as a rotating force to the output shaft 4.

The output shaft 4 is disposed coaxially with the armature shaft 8*a*, and supported rotatably in the housing 18 through a rear bearing 17 and a front bearing (not shown). The output shaft 4 is formed with a flange 4*a* at its rear end which faces the armature 8. The flange 4*a* has an enlarged diameter than other parts of the output shaft 4. A plurality of (four) carrier pins 19 are press-fit into the pin holes of the flange 4*a*. Each carrier pin 19 rotatably supports the planetary gear 16 thereon through a bearing 20.

Figure 2:
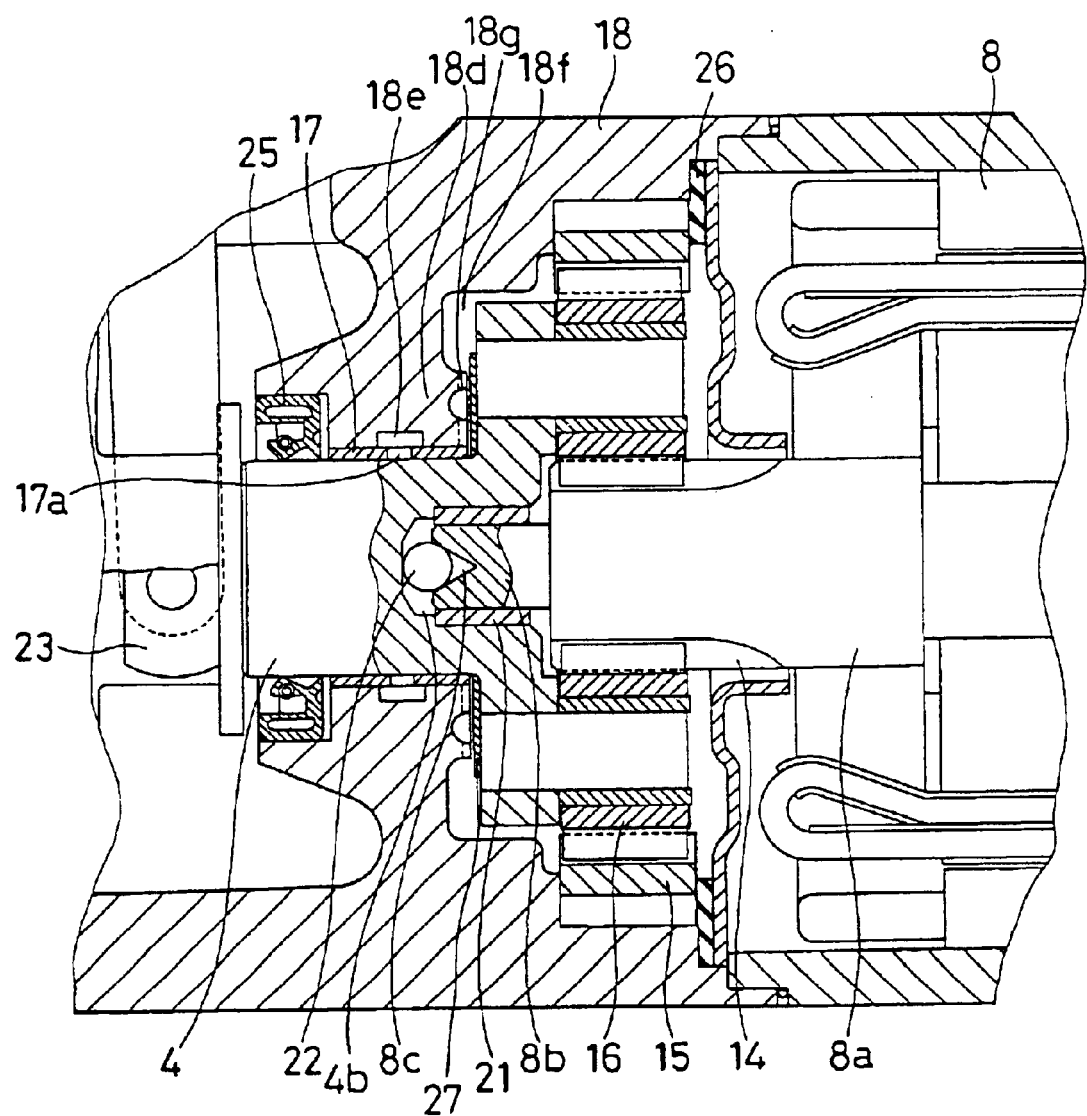
FIG. 2 is an enlarged sectional view showing a rear bearing for holding the output shaft of the starter shown in FIG. 1.

The output shaft 4 is also formed with an accommodation recess 4*b* at its rear end in its radial center. The accommodation recess 4*b* is radially inside the flange 4*a*. The armature shaft 8*a* has a top end 8*b* having the reduced diameter in its radial center. This top end 8*b* is inserted into the accommodation recess 4*b* through a bearing 21. A conical recess 8*c* is formed on the end surface of the top end 8*b* in the radial center of the top end 8. A ball 22 is disposed between the bottom surface (axial end surface) of the accommodation recess 4*b* and the top surface of the top end 8*b* of the armature shaft 8*a*. The ball 22 thus received in the recess 8*c* thus limits the movement of the output shaft 4 toward the motor side as shown in FIG. 2.

The one-way clutch 5 is a known roller type. The clutch 5 is helical-spline fit on the outer periphery of the output shaft 4, and coupled with the plunger 11 of the electromagnetic switch device 3 through a lever 23. Thus, the one-way clutch 5 is movable in the axial direction between the front bearing (not shown) and the rear bearing 17 in response to the movement of the plunger 11. The pinion gear 6 is coupled with the one-way clutch 5. The pinion gear 6 thus moves with the clutch 5 in the axial direction and meshes with the ring gear 24 of an internal combustion engine (not shown) to transmit the rotating force of the motor 2 to the ring gear 24.

Figure 3A:
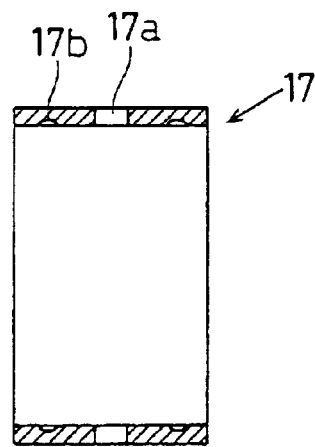
FIG. 3A is cross-sectional view showing a rear bearing shown in FIG. 2.
Figure 3B:
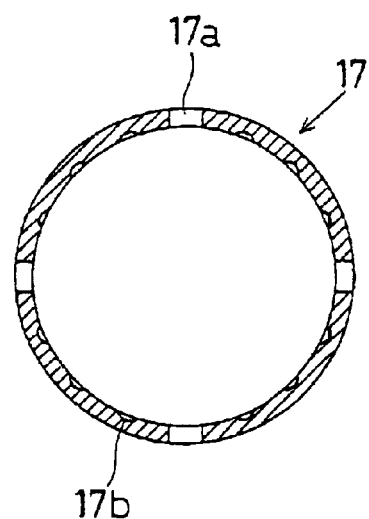
FIG. 3B is longitudinal sectional view showing a rear bearing shown in FIG. 2.

The rear bearing 17 is a plate type cylindrical bearing, of which bearing surface is in sliding contact with the outer peripheral surface of the shaft 4. The rear bearing 17 is disposed in proximity to the flange 4*a* for holding the output shaft 4. The rear bearing 17, as shown in FIGS. 3A and 3B, has a plurality of (four in FIG. 3B) through holes 17*a*, which pass in the radial direction between the inner surface and the outer surface. The through holes 17*a* are arranged at equal angular interval. The rear bearing 17 moreover has a plurality of recesses 17*b* on the inner surface in the axial and circumferential directions. The recesses 17*b* hold lubricant therein.

The housing 18 has a flange 18*a* and a nose 18*b*. The flange 18*a* is for fixing the starter 1 to the engine when the starter 1 is assembled to the engine. The nose 18*b* is at the front side of the flange 18*a* and covers the pinion gear 6. The nose 18*b* however has an opening 18*c* from which the pinion gear 6 is exposed to engage with the ring gear 24.

The housing 18 has a holding part 18*d* for holding the rear bearing 17 as shown in FIG. 2. A groove 18*e* is formed annularly or in the ring-shape in the inner peripheral surface of the holding part 18*d*. The through holes 17*a* are communicated with the groove 18*e*.

The housing 18 further has channels 18*f* and 18*g*. The channels 18*f* are formed in the inner wall, which faces the flange 4*a* of the output shaft 4 axially and radially. The channels 18*g* are formed in the radial direction in a part of the housing 18 facing a thrust washer 27 which is disposed between the housing 18 and the output shaft 4 for receiving thrust load from the output shaft 4. The channels 18*f* and 18*g* lead lubricant which flows out of the reduction device to the rear bearing 17. The channels 18*g* may be provided to communicate with the groove 18*e*.

A seal member 25 is press-fit in the holding part 18*d* in sliding contact with the outer periphery of the output shaft 4 at the front side of the rear bearing 17, that is, at the side opposite the motor 2. This seal member 25 is an oil seal, for instance, and located predetermined distance (about 0.5 to 3.0 mm) away from the rear bearing 17 in the axial direction.

A ring-shaped rubber cushion 26 is interposed between the internal gear 15 and a partition plate as shown in FIGS. 1 and 2.

The starter 1 as constructed above operates as follows.

When the ignition key switch 9 is turned on to energize the exciting coil 10 of the electromagnetic switch device 3, the plunger 11 is attracted by the magnetic force. Movement of the plunger 11 is transmitted to the one-way clutch 5 through the lever 23. The one-way clutch 5 is pushed forward together with the pinion gear 6 until the pinion gear 6 comes to contact the ring gear 24.

When the plunger 11 is attracted further and the movable contact 12 comes into contact with the fixed contacts 13, the motor current is supplied from the battery 7 to the armature 8. The armature 8 starts to rotate with this motor current. The rotation of the armature 8 is transmitted to the output shaft 4 while being reduced in rotation speeds by the reduction device. The rotation of the output shaft 4 is transmitted to the pinion gear 6 through the one-way clutch 5. The pinion gear 6 rotates to mesh with the ring gear 24 and moves forward to rotate the ring gear 24, thus attaining engine starting.

After the engine starts rotating, the ignition key switch 9 is turned off to stop energization of the exciting coil 10. The plunger 11 is pushed back by a spring (not shown) to disengage the movable contact 12 from the fixed contacts 13, thereby stopping the supply of motor current and stopping the rotation of armature 8. With this movement of plunger 11 through the lever 23, the one-way clutch 5 is pulled back toward the motor side, the pinion gear 6 is disengaged from the ring gear 24 and returned to the original position with the one-way clutch 5.

In the above embodiment, the starter 1 has the seal member 25 at the front side of the rear bearing 17. The seal member prevents the entering of foreign substances (such as water, dust and the like) into the bearing surface of the bearing 17 even if they come in from the opening 18*c* of the housing 18. In addition, the seal member 25 inhibits the flowing out of the lubricant from the rear bearing 17. As a result, the bearing 17 maintains high performance for a long time, and lowering of performance of the starter 1 is minimized.

The groove 18*e* formed in the inner peripheral surface of the holding part 18*d* of the housing 18 is filled with lubricant in advance. The lubricant held in the groove 18*e* is provided to the rear bearing 17 from the through holes 17*a*. Thus it prevents shortage of lubricant at the bearing surface of the rear bearing 17. As a result, the bearing 17 maintains high performance for a long time and lowering of performance of the starter 1 is minimized even if the quantity of lubricant held in the bearing 17 is small.

In addition, the recesses 17b formed on the inner surface of the rear bearing 17 are filled with lubricant in advance. Thus the bearing 17 maintains much lubricant therein, and, as a result, lowering of performance of the starter 1 is minimized even when the starter 1 is operated continuously.

Moreover, the channels 18f and 18g formed on the housing 18 lead the lubricant which flows out of the reduction device to the rear bearing 17. When the bearing 17 runs short of lubricant, the recesses 17b of the bearing 17 are refilled with the lubricant which is led to the bearing 17 by the channels 18f and 18g.

In the above embodiment, the planetary type reduction device is adopted. But other types of reduction device can alternate it. For instance, it is also adoptable to reduce rotation by an idle gear meshed between the driving gear fit to the armature shaft 8a and the driven gear fit to the output shaft 4, while setting the armature shaft 8a of the motor 2 and the output shaft 4 in parallel.

The present invention should not be limited to the disclosed embodiment, but may be implemented in many other ways without departing from the spirit of the invention.

What is claimed is:

1. A starter comprising:

a motor having a motor shaft;

an output shaft having a pinion gear;

a reduction device for transmitting rotation of the motor shaft to the output shaft in reduced rotation speeds;

a housing which holds the output shaft rotatably therein;

a bearing disposed between the housing and the output shaft in proximity to the reduction device; and a seal member disposed in proximity to the pinion gear side of the bearing in sliding contact with an outer periphery of the output shaft.

2. A starter as in claim 1, wherein:

the housing has a holding part for holding the bearing;

the holding part has a groove formed annularly in an inner peripheral surface thereof at a position radially outside the bearing; and the bearing has a plurality of through holes, which pass in a radial direction between an inner surface and an outer surface thereof and are communicated with the groove.

3. A starter as in claim 1, wherein:

the bearing has a plurality of recesses formed in an inner peripheral surface thereof.

4. A starter as in claim 1, wherein:

the housing has channels to lead lubricant which flows out of the reduction device to the bearing.

5. A starter as in claim 1, wherein:

the reduction device is a planetary gear type, which has a sun gear formed on the motor shaft, a ring-shaped internal gear disposed radially outside the sun gear and a plurality of planetary gears in meshing engagement with the sun gear and the internal gear; and the planetary gears are driven by rotation of the sun gear to rotate about respective rotation axes which revolve around the sun gear.

6. A starter comprising:

a motor having a motor shaft;

an output shaft having a pinion gear;

a reduction device for transmitting rotation of the motor shaft to the output shaft in reduced rotation speeds;

a housing which holds the output shaft rotatably therein;

a bearing disposed between the housing and the output shaft in proximity to the reduction device, wherein;

the reduction device is a planetary gear type, which has a sun gear formed on the motor shaft, a ring-shaped internal gear disposed radially outside the sun gear and a plurality of planetary gears in meshing engagement with the sun gear and the internal gear;

the planetary gears are driven by rotation of the sun gear to rotate about respective rotation axes which revolve around the sun gear;

the housing has a holding part for holding the bearing;

the holding part has a groove formed annularly in an inner peripheral surface thereof at a position radially outside the bearing; and the bearing has a plurality of through holes, which pass in a radial direction between an inner surface and an outer surface thereof and are communicated with the groove.

7. A starter as in claim 6, wherein:

the bearing has a plurality of recesses formed in the inner peripheral surface thereof.

8. A starter as in claim 6, wherein:

the housing has channels to lead lubricant which flows out of the reduction device to the bearing.

* * * * *